(12) United States Patent
McHugh, IV et al.

(10) Patent No.: US 11,389,680 B2
(45) Date of Patent: Jul. 19, 2022

(54) MAIN VALVE WITH PRESSURE RELIEF VALVE HAVING A LOCKOUT FEATURE

(71) Applicant: AGF Manufacturing, Inc., Malvern, PA (US)

(72) Inventors: George J. McHugh, IV, Malvern, PA (US); James P. McHugh, Newtown Square, PA (US); Bentley F. Gleeson, Plymouth Meeting, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 219 days.

(21) Appl. No.: 16/371,528

(22) Filed: Apr. 1, 2019

(65) Prior Publication Data

US 2019/0308046 A1    Oct. 10, 2019

Related U.S. Application Data

(60) Provisional application No. 62/654,507, filed on Apr. 8, 2018.

(51) Int. Cl.
*A62C 35/68* (2006.01)
*F16K 1/14* (2006.01)
(Continued)

(52) U.S. Cl.
CPC .............. *A62C 35/68* (2013.01); *A62C 35/60* (2013.01); *F16K 1/14* (2013.01); *F16K 17/06* (2013.01)

(58) Field of Classification Search
CPC ........... A62C 35/60; A62C 35/68; F16K 1/14; F16K 17/06
(Continued)

(56) References Cited

U.S. PATENT DOCUMENTS 1,056,562 A * 3/1913 Lombard ............ F16K 17/0433
137/471
3,345,032 A * 10/1967 Rawstron ............ F16K 11/0876
251/172
(Continued)

FOREIGN PATENT DOCUMENTS

JP    S52-044430 U    3/1977
JP    2008-138784 A   6/2008
(Continued)

OTHER PUBLICATIONS

Notification of Transmittal of the International Search Report (Form PCT/ISA/220 and PCT/ISA/210) and the Written Opinion of the International Searching Authority (Form PCT/ISA/237) dated Oct. 24, 2019, by the Korean Intellectual Property Office in corresponding International Application No. PCT/US2019/025107. (13 pages).

*Primary Examiner* — Qingzhang Zhou
(74) *Attorney, Agent, or Firm* — Panitch Schwarze Belisario & Nadel LLP (57) ABSTRACT

An integral valve arrangement may comprise a housing. The housing may comprise a main valve and a relief valve. The main valve may comprise an inlet and a first outlet. The relief valve may comprise a relief inlet in a side wall of the inlet, a relief outlet in a side wall of the first outlet, and a pressure relief system. The inlet and the first outlet may be substantially axially perpendicular. The relief inlet and the relief outlet may be substantially axially perpendicular. The pressure relief system may comprise a body abutting walls of the housing, a relief member disposed within the body, and a lever. The relief member may comprise an interior end and an exterior end. The lever may be rotatably coupled to the exterior end of the relief member by a connecting mechanism.

20 Claims, 7 Drawing Sheets

(51) Int. Cl.
*A62C 35/60* (2006.01)
*F16K 17/06* (2006.01)

(58) Field of Classification Search
USPC .......................................................... 169/16
See application file for complete search history.

(56) References Cited

U.S. PATENT DOCUMENTS

| | | | | |
|---|---|---|---|---|
| 5,103,862 | A * | 4/1992 | McHugh | A62C 35/68 251/315.04 |
| 5,662,139 | A * | 9/1997 | Lish | A62C 37/50 251/83 |
| 6,186,169 | B1 * | 2/2001 | McHugh | F16K 5/0605 251/315.01 |
| 6,302,146 | B1 * | 10/2001 | McHugh | A62C 37/50 137/559 |
| 6,810,910 | B2 * | 11/2004 | McHugh | A62C 37/50 137/559 |
| 7,322,372 | B2 * | 1/2008 | Trapp | F16K 31/143 137/12 |
| 7,712,724 | B2 * | 5/2010 | Thomas | F16K 11/0873 251/314 |
| 8,051,915 | B2 * | 11/2011 | Blease | F16K 17/386 169/16 |
| 9,964,232 | B2 * | 5/2018 | Smithson | F16K 17/04 |
| 2018/0193681 | A1 * | 7/2018 | Meyer | A62C 35/68 |
| 2019/0264795 | A1 * | 8/2019 | Nakayama | F16K 17/06 |
| 2019/0308046 | A1 * | 10/2019 | McHugh, IV | F16K 37/0058 |

FOREIGN PATENT DOCUMENTS

| | | |
|---|---|---|
| KR | 10-2012-0016742 A | 2/2012 |
| KR | 10-1507141 B1 | 3/2015 |

\* cited by examiner

MAIN VALVE WITH PRESSURE RELIEF VALVE HAVING A LOCKOUT FEATURE

FIELD OF THE INVENTION

The present invention relates generally to valves, and more particularly, to valve arrangements for use in testing and draining fire suppression water sprinkler systems.

BACKGROUND OF THE INVENTION

In a typical fire suppression water sprinkler system as installed in many buildings, an array of individual fire sprinklers is supplied with fire suppressant (e.g., water, chemical suppressants, nitrogen, potassium bicarbonate powder, halon, etc.) through a main conduit and various branch conduits. The individual fire sprinklers are generally provided with a member that melts, breaks a glass pip, or otherwise reacts when the ambient temperature reaches a predetermined level indicative of a fire. The melting of the member for instance opens a fire sprinkler to spray water in order to suppress a fire. The activated individual fire sprinklers in a given area will hopefully be limited to the region of the building where the fire is present. In this way, the extent of water damage or the like may be minimized.

After a fire, or during set-up, maintenance, or renovation, it may become necessary to replace one or more of the individual water sprinklers. At such times it is desirable to be able to drain the system of water conduits, so that the removal of one or more of the individual water sprinklers (after the supply of water to the main conduit has been turned off and after the system has been drained) will not result in a flow of water through the fitting for the water sprinkler. Accordingly, it is conventional in the art to provide a valve which when opened will drain the water conduits of the system.

Such fire suppression systems also oftentimes have a switch or sensor that detects the flow of water in the conduits to indicate that even only one of the individual water sprinklers has been opened. Since the flow of water in the conduits generally means that a fire is present in the building, the switch or sensor typically triggers a fire alarm or sends an appropriate signal directly to a fire department. Therefore, many fire codes require, and it is otherwise desirable, that the switch or sensor which detects the flow of water in the conduits be periodically tested. Accordingly, it has also become conventional in the art to provide a valve which enables the system to be tested by permitting a flow of water corresponding to the flow through only one individual water sprinkler that has been opened.

The use of separate drainage valves and testing valves results in significant time and expense during the installation of such plumbing. In fire systems, it is also sometimes desirable or necessary (and may be required by local ordinance) to provide a pressure relief mechanism in the fire sprinkler system in communication with the arrangement of piping that supplies water (or some other fluid) to the individual sprinkler heads. In order to provide a pressure relief feature for a fire sprinkler system, it is known to provide a pressure relief valve in the piping arrangement in communication with the sprinkler heads and to connect an inlet of a suitable, conventional pressure relief valve with the arrangement of piping through one of the openings in the pressure relief valve. The outlet of the pressure relief valve is then directed as desired, either to a drain or outside of the structure being protected by the fire sprinkler system.

The pressure relief valve interferes with testing of the fire sprinkler system requiring build of pressure within the fire sprinkler system. For instance, when testing a sprinkler system, the pressure of the suppressant is elevated well beyond the threshold for the pressure relief valve to open, in order to test for leaks in the system. In order to provide a solution, it is known from U.S. Pat. No. 5,662,139, for instance, to add a hook to restrict the operation of a lever connected to a valve stem of the pressure relief valve in order to prevent the pressure relief valve from opening, despite any amount of pressure build up in the system. However, the '139 valve lacks an approved test orifice, sight glass, and removal/repair availability, requires it be added to the conduit system as a discrete part thereby increasing the chance of defective installation and increasing the bulk and expense of the system. Alternatively, as part of the test process (and during initial installation and maintenance), service personnel must complete the test, drain down part of the fire sprinkler system, remove an adapter cap plug, install the pressure relief valve, and install a drain piping trim, proving to be costly in personnel and project time and efficiency.

SUMMARY OF THE INVENTION

In an embodiment of a disclosed integral valve arrangement, the integral valve arrangement may comprise a housing. The housing may comprise a main valve and a relief valve. The main valve may comprise an inlet and a first outlet. The relief valve may comprise a relief inlet in a side wall of the inlet of the main valve, a relief outlet in a side wall of the first outlet of the main valve, and a pressure relief system. The inlet and the first outlet of the main valve may be substantially axially perpendicular. The relief inlet and the relief outlet of the relief valve may be substantially axially perpendicular. The pressure relief system may comprise a body abutting walls of the housing, a relief member disposed within the body, and a lever. The relief member may comprise an interior end and an exterior end. The lever may be rotatably coupled to the exterior end of the relief member by a connecting mechanism.

In an embodiment of a disclosed fire suppression sprinkler system, the fire suppression sprinkler system may comprise a main conduit, at least one branch conduit in fluid communication with the main conduit, at least one sprinkler head coupled to the at least one branch conduit, and an integral valve arrangement for testing and draining the fire suppression sprinkler system in fluid communication with the main conduit. The integral valve arrangement may comprise a housing. The housing may comprise a main valve and a relief valve. The main valve may comprise an inlet and a first outlet. The relief valve may comprise a relief inlet in a side wall of the inlet, a relief outlet in a side wall of the first outlet, and a pressure relief system. The inlet and the first outlet may be substantially axially perpendicular. The relief inlet and the relief outlet may be substantially axially perpendicular. The pressure relief system may comprise a body abutting walls of the housing, a relief member disposed within the body, and a lever. The relief member may comprise an interior end and an exterior end. The lever may be rotatably coupled to the exterior end of the relief member by a connecting mechanism.

BRIEF DESCRIPTION OF THE DRAWING FIGURES

Exemplary embodiments of the disclosed valve arrangement will be described in greater detail with reference to the accompanying drawings, wherein like members bear like reference numerals and wherein.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
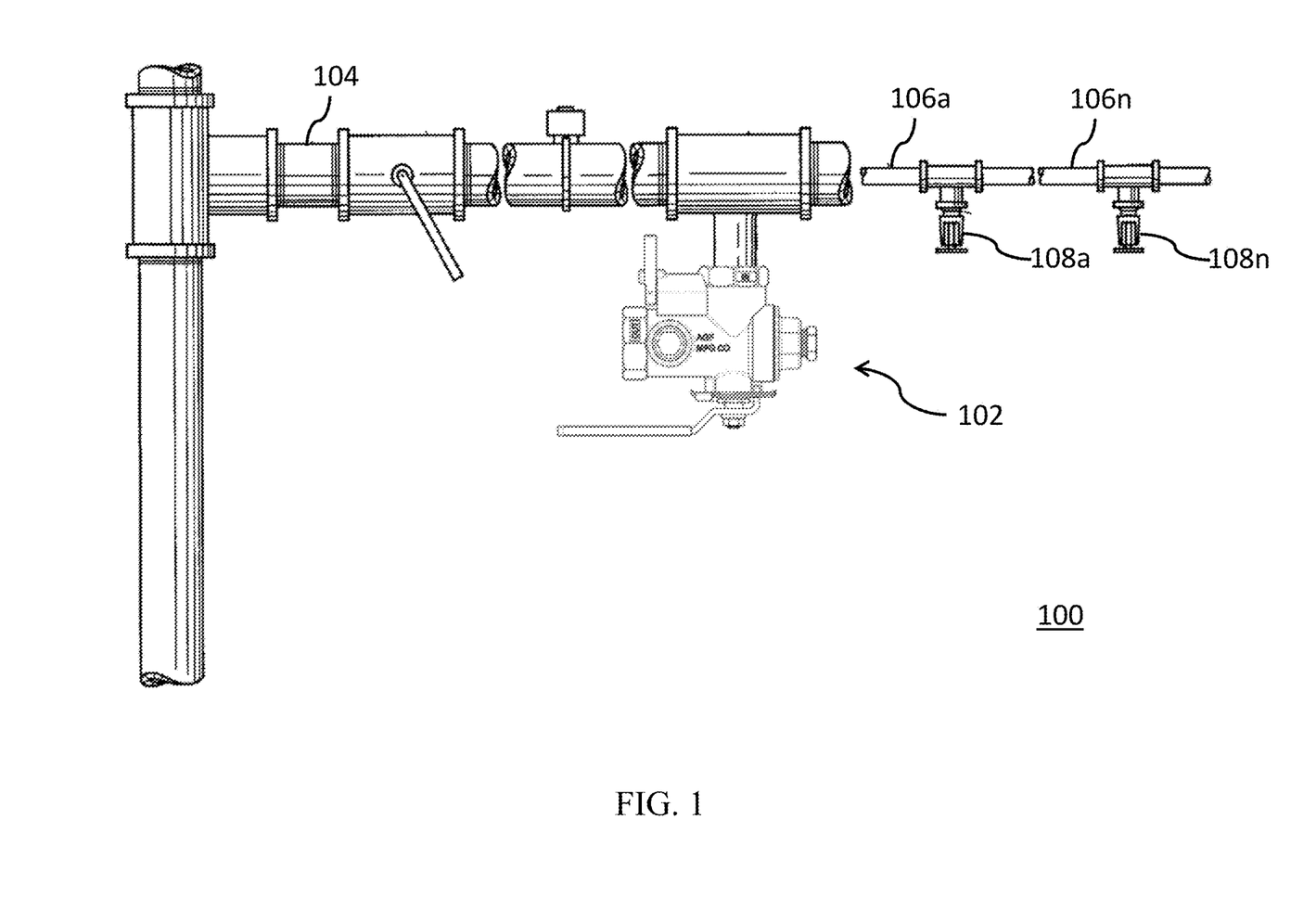
FIG. 1 is an illustration of a fire suppression sprinkler system according to an embodiment of the disclosed fire suppression sprinkler system.

With regard to FIG. 1, an illustration of a fire suppression sprinkler system 100 according to an embodiment of the disclosed fire suppression sprinkler system is shown. The fire suppression sprinkler system 100 may comprise a valve arrangement 102, a main conduit 104, at least one branch conduit 106a-106n (collectively 106), and at least one sprinkler head 108a-108n (collectively 108). The at least one branch conduit 106 may be in fluid communication with the main conduit 104. The at least one sprinkler head 108 may be coupled to the at least one branch conduit 106. The valve arrangement 102 may be in fluid communication with the main conduit 104 on its inlet side, with the outlet side being open, connected to a drain pipe or the like or back into the conduit system. In one embodiment, the fire suppression sprinkler system 100 may be configured to suppress a fire using at least one of water, chemical suppressants, nitrogen, potassium bicarbonate powder, halon, or any other fire suppressant. One of skill in the art will appreciate that any fire suppressant may be utilized in a fire suppression sprinkler system 100 as described herein. In one embodiment, the valve arrangement 102 may be coupled to the main conduit 104 by way of a Tee fitting. One of skill in the art will appreciate that a plurality of connecting mechanisms may exist to couple components of a sprinkler system.

With regard to FIGS. 2-5, an illustration, a side perspective view, a top perspective view, and an end perspective view, respectively, of a valve arrangement 102 according to an embodiment of the disclosed valve arrangement is shown. The valve arrangement 102 is described further hereinbelow.

The valve arrangement 102 may be an integral valve arrangement that comprise a housing that may form the outer walls of a main valve and a relief valve. The main valve may comprise an inlet 202 and a first outlet 204. In some embodiments, the main valve may further comprise a second outlet 206. The inlet 202 and the first outlet 204 may be substantially perpendicular to one another. The second outlet 206 may be substantially perpendicular to the inlet 202 and may be provided along a common axis with the first outlet 24. The inlet 202 of the main valve may be provided in fluid communication with the main conduit 104 of FIG. 1. In one embodiment, the main valve may be a ball valve as described in greater detail below and shown in FIG. 6. The main valve and the relief valve in the exemplary embodiments are shown as having their respective inlets and outlets at 90 degrees relative to each other, but they may be at other substantially perpendicular angles that would not prevent the operation of the relief valve or main valve.

Figure 2:
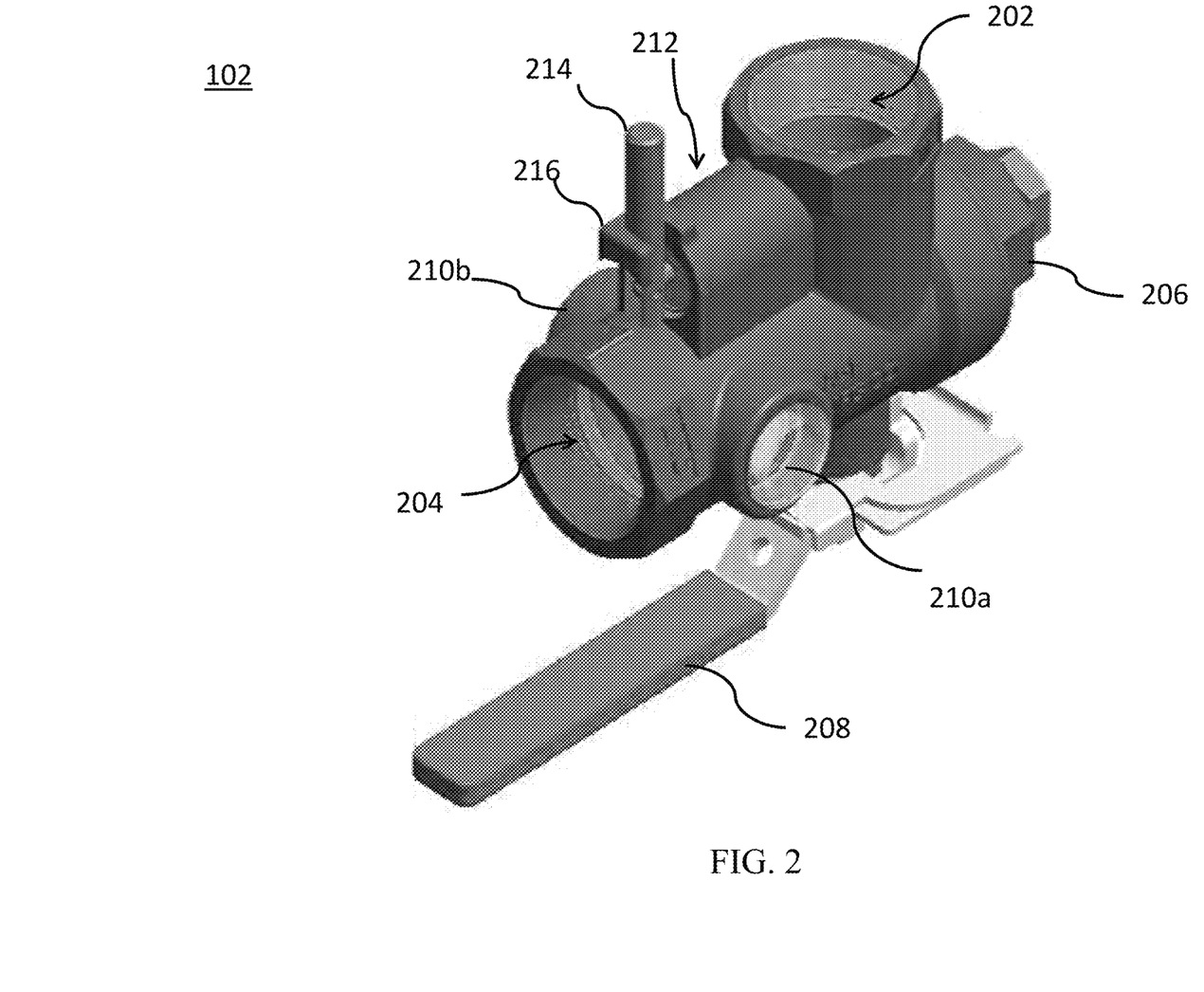
FIG. 2 is an illustration of a valve arrangement according to an embodiment of the disclosed valve arrangement.
Figure 3:
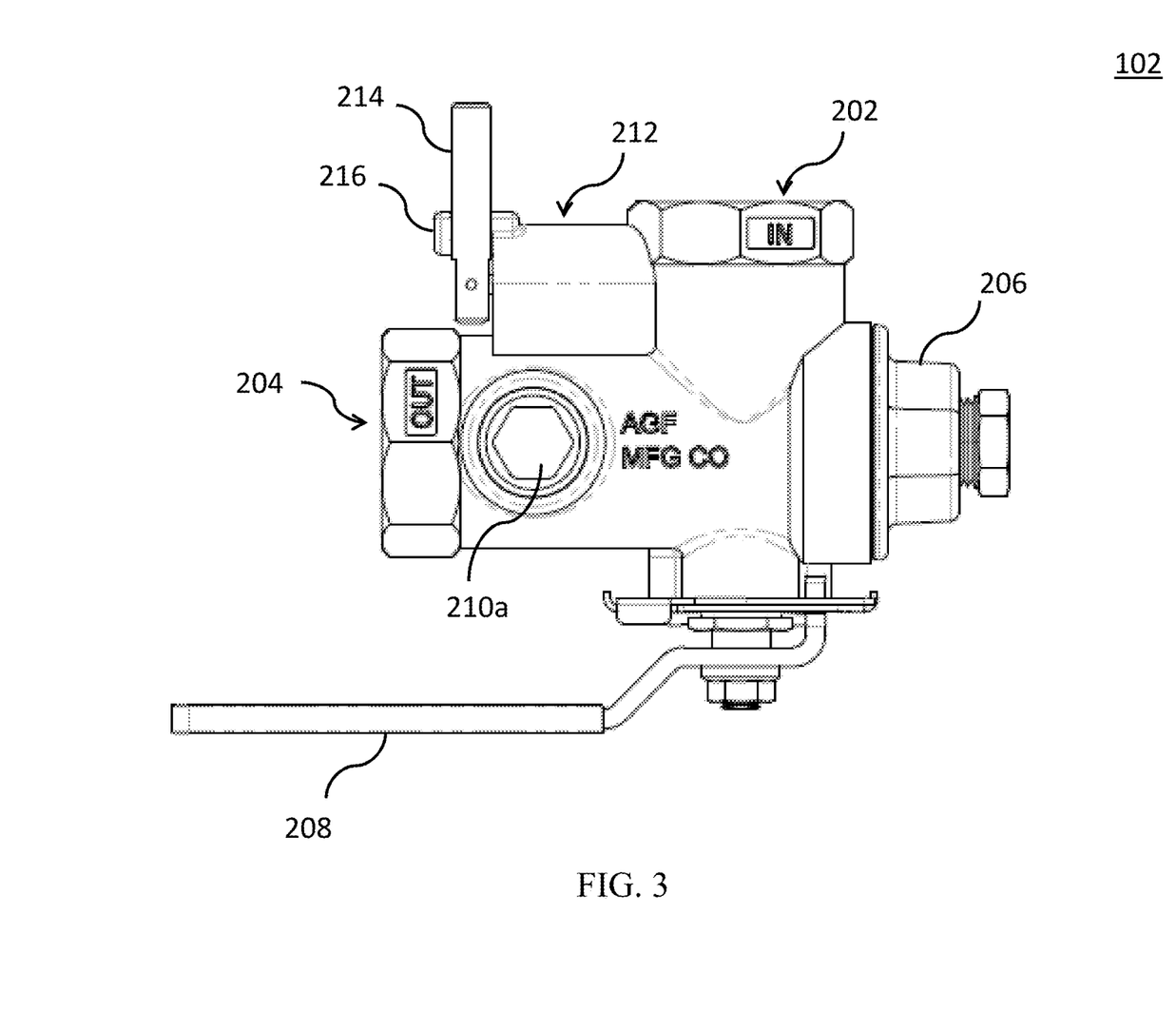
FIG. 3 is a side perspective view of a valve arrangement according to an embodiment of the disclosed valve arrangement.
Figure 4:
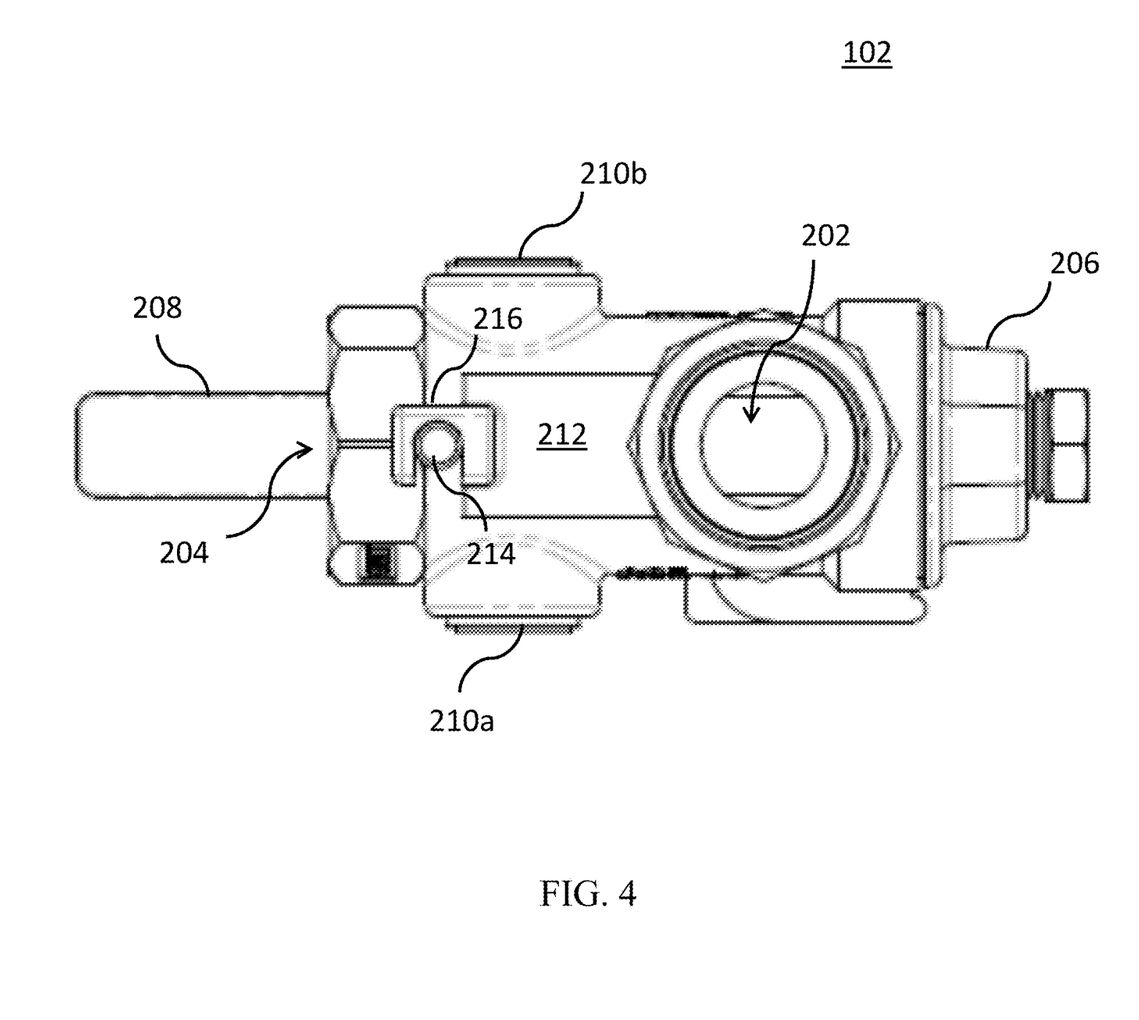
FIG. 4 is a top perspective view of a valve arrangement according to an embodiment of the disclosed valve arrangement

The housing may further comprise a handle 208. In one embodiment, the handle 208 may be moveable between an "off" position, a "test" position, and a "drain" position. In response to the handle 208 being in the "off" position, fluid communication between the inlet 202 and the first outlet 204 is prevented because one side of the orifice or orifices of a ball 606 (FIG. 6) face a interior wall of the main valve or opening to second outlet 206, which may be capped as shown. In response to the handle 208 being in the "test" position, fluid communication between the inlet 202 and the first outlet 204 may be permitted to enable a flow corresponding to a flow through a single sprinkler head for instance, typically by rotating the ball 90 degrees which may put the orifice in communication with the first outlet 204. The orifice may comprise a varying size in order to provide an equivalent flow to a single sprinkler with a plurality of different flow rates. A flow rate of a sprinkler may be referred to as a k-factor. In some embodiments, a test valve, such as the main valve, may comprise a plurality of test orifice k-factors. In response to the handle 208 being in the "drain" position, fluid communication between the inlet 202 and the first outlet 204 may be permitted to enable a substantially unrestricted flow to provide a rapid draining of conduits. In one embodiment, the housing may further comprise at least one sight glass 210a, 210b (collectively 210) in order to permit a visual observation of a flow through the first outlet 204. In one embodiment, the at least one sight glass 210 may comprise two sight glasses in order for an illumination to be applied into one of the two sight glasses so that fluid movement may be seen through the other of the two sight glasses.

The relief valve may comprise an integral pressure relief system 212 and a lever 214 rotatably coupled to the pressure relief system 212. In one embodiment, the relief valve may further comprise a hook 216 that may hold the lever 214. In response to the lever 214 being placed in the hook 216, a relief member of the pressure relief system 212 may be prevented from opening in response to a pressure substantially higher than a pressure threshold for opening the relief member. The pressure relief system 212 may be discussed in greater detail hereinbelow with regard to FIGS. 6 and 7.

Figure 5:
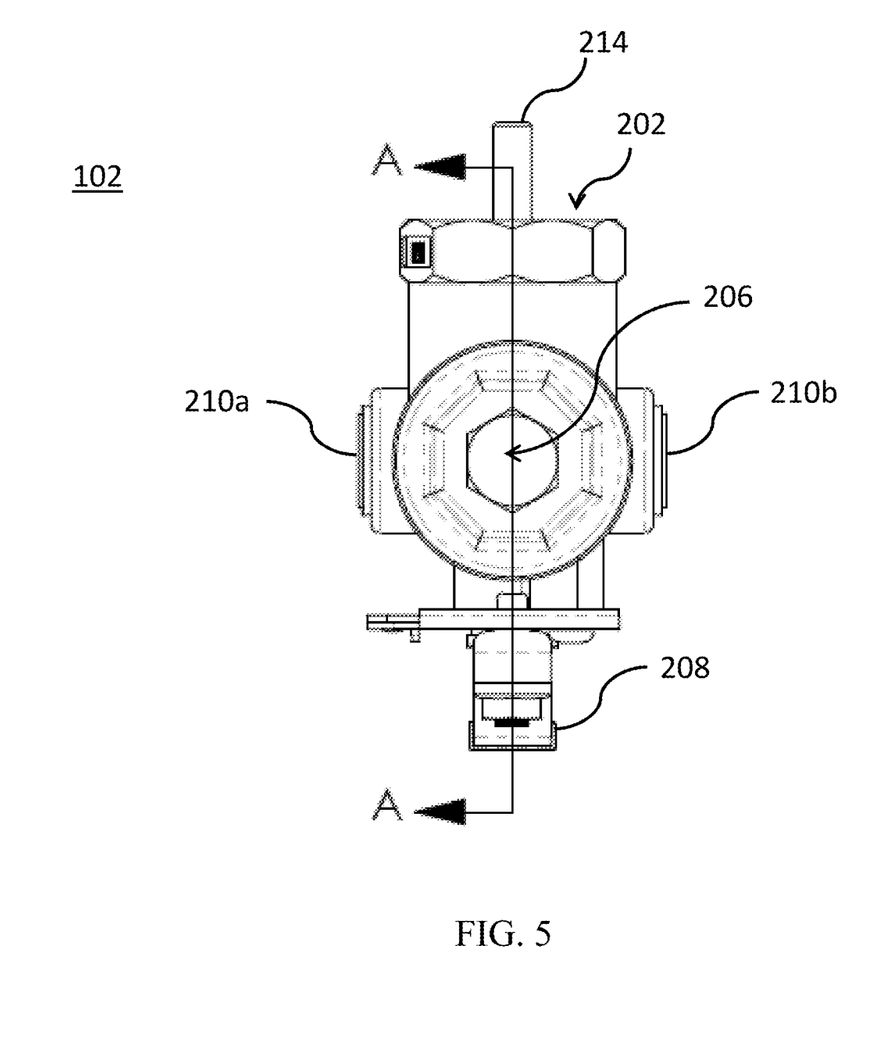
FIG. 5 is an end perspective view of a valve arrangement according to an embodiment of the disclosed valve arrangement.
Figure 6:
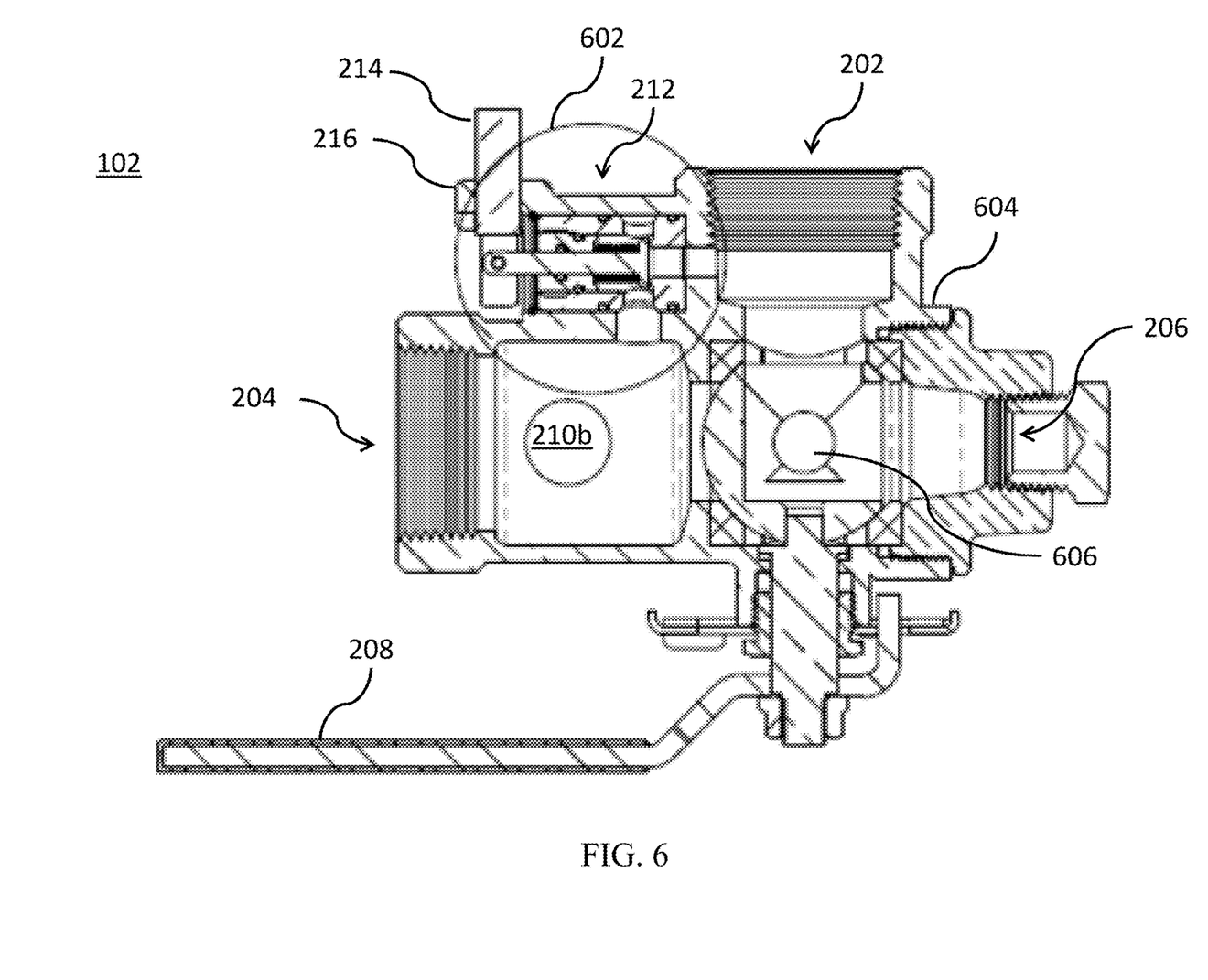
FIG. 6 is a side perspective view in cross-section A-to-A of FIG. 5 of a valve arrangement according to an embodiment of the disclosed valve arrangement.

With regard to FIG. 6, a side perspective view in cross-section A-to-A of FIG. 5 of a valve arrangement 102 according to an embodiment of the disclosed valve arrangement is shown. A selection 602 may show the pressure relief system 212 as described hereinabove with regard to FIG. 2. The valve arrangement 102 may comprise a housing 604, such as the housing of FIG. 2. In one embodiment, a main valve of the valve arrangement 102 may be a ball valve that may comprise a ball 606. The ball 606 is attached to the lever 208, with an inlet orifice opposite to the lever connection point, a hollow interior and one or two orthogonally oriented outlet orifices of different sizes to selectively open the valve for instance by one-half and fully open, in the exemplary embodiment shown. One of skill in the art will appreciate that the ball valve may be any of a plurality of styles including, but not limited to, single body, three-piece body, split body, top entry, welded, or otherwise.

The pressure relief system 212 may be configured to be integrated into the housing 604 of the valve arrangement, making the main valve and the relief valve integral to one another. In operation, service personnel may place the lever 214 behind the hook 216 so that the hook 216 may hold captive the lever 214 and pressure relief system 212 so that a test may be done on the sprinkler system without the pressure relief system 212 relieving the higher than normal operating pressure during a test, for instance. After the test, the service personnel may move the lever 214 out from behind the hook 216 to allow the pressure relief system 212 to function. In one embodiment, the pressure relief system 212 may be detachably coupled to the housing 604 so that service personnel may repair and/or replace the pressure relief system 212.

In one embodiment, the lever 214 may be configured to be moved from behind the hook 216 and rotated away from the pressure relief system 212 to cause the pressure relief system 212 to open. In one embodiment, the opening the pressure relief system 212 by way of rotating the lever 214 may be part of an alarm test process.

Figure 7:
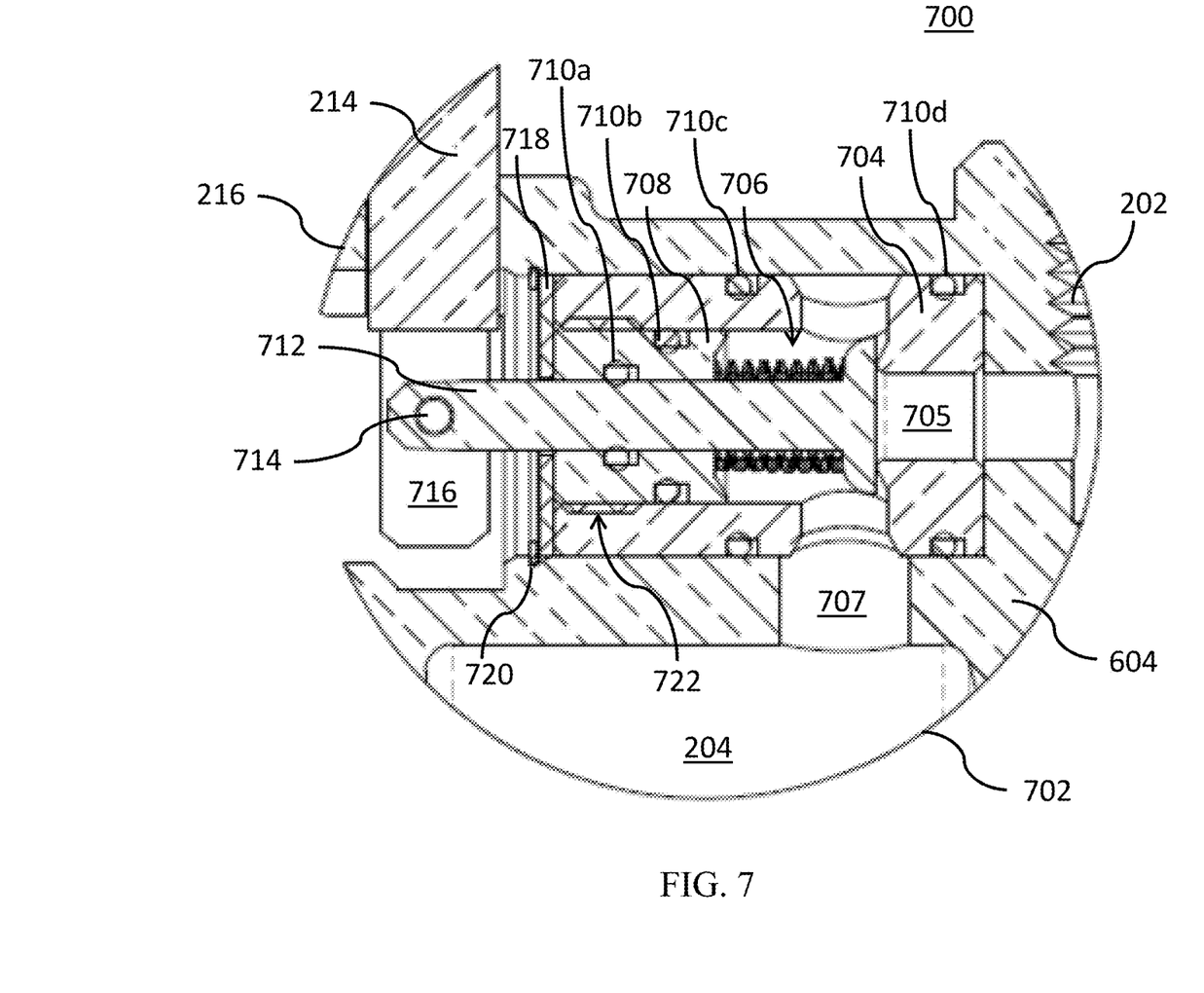
FIG. 7 is a side perspective view in cross-section of a pressure relief system according to an embodiment of the disclosed valve arrangement.

With regard to FIG. 7, a side perspective view in cross-section of a pressure relief system 700 according to an embodiment of the disclosed valve arrangement is shown. The pressure relief system 700 may be the relief valve described hereinabove with regard to FIG. 1. The selection 702 may be the selection 602 of FIG. 6. The pressure relief system 700 may include a base 704, a relief inlet 705, a relief outlet 707, a spring 706, a tensioner 708, at least one ring seal 710a, 710b, 710c, 710d (collectively 710), and a relief member 712 disposed within the spring 706 and tensioner 708. The relief member 712 may comprise an open position that may enable fluid communication between the relief inlet 705 in a side wall of the main valve inlet 202 and the relief outlet 707 that drains into the outlet 204 of the main valve, and a closed position that may prevent fluid communication between the relief inlet 705 and the relief outlet 707. The spring 706 and tensioner 708 may be configured to bias the relief member 712 to the closed position. By selecting the spring constant and tensioner axial position, the threshold pressure of the relief valve can be selected.

The relief inlet 705 may disposed within a side wall of the inlet 202 of the main valve to enable fluid communication between the main valve and the relief valve. The relief outlet 707 may disposed within a top wall of the first outlet 204 of the main valve to enable fluid communication between the relief valve and the main valve. In one embodiment, the relief inlet 705 and the relief outlet 707 may be substantially perpendicular to one another. In an exemplary embodiment such as shown, this integral and compact design may represent a compact, adaptable, unitary design that avoids the additional piping and connections of the prior art.

In one embodiment, the at least one ring seal 710 may comprise a first ring seal 710d interposed between walls of the housing 604 and a first notch around a first perimeter of the body 704, a second ring seal 710c interposed between the walls of the housing 604 and a second notch around a second perimeter of the body 704, a third ring seal 710b interposed between the body 704 and a third notch around a third perimeter of the tensioner 708, and a fourth ring seal 710a interposed between the relief member 712 and a fourth notch around a fourth interior perimeter of the tensioner 708. The first perimeter may be on an interior portion of the body 704 adjacent to the relief inlet 705. The second perimeter may be on a middle portion of the body 704 and opposite the relief outlet 707 from the first perimeter.

The lever 214 may be rotatably coupled to the relief member 712 by a connecting mechanism 714. In one embodiment, the connecting mechanism 714 may be a pin. One of skill in the art will appreciate that a plurality of mechanisms may exist to rotatably couple items together. The lever 714 may be rotatably coupled so that a lower portion 716 of the lever 214 extends beyond the connecting mechanism 714. In response to the lever 214 being rotated away from the pressure relief system 212, the lower portion 716 rotates up and into the pressure relief system 212 so that the relief member 712 is pulled away from the relief inlet 705 and into the open position.

In one embodiment, the pressure relief system 212 may further comprise a nameplate 718 and a retaining ring 720. The nameplate 718 may define an exterior wall of the body 704 opposite the body 704 from the relief inlet 705. The retaining ring 720 may be disposed external to the nameplate 718 to seal and prevent leakage of the pressure relief system 212.

In one embodiment, the tensioner 708 may comprise threads 722 to provide precise adjustment of the tensioner 708 and spring 706 in order to bias the relief member 712 to the closed position according to a predetermined standard and/or pressure threshold. The spring 706 and tensioner 708 may be configured to provide a force to the relief member 712 such that fluid communication between the relief inlet 705 and the relief outlet 707 may be prevented until pressure at the relief inlet 705 may exceed the pressure threshold. In one embodiment, the pressure threshold may be approximately 175 pounds, but of course by selecting various dimensions and materials, nearly any pressure threshold could be selected. In another embodiment, the pressure threshold may be a value set by service personnel or other operators of the sprinkler system.

The foregoing outline features several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integral valve arrangement, comprising:
a housing comprising a main valve and a relief valve, the main valve comprising an inlet and a first outlet, and the relief valve comprising a relief inlet in a side wall of the inlet, a relief outlet in a side wall of the first outlet, and a pressure relief system, the inlet and the first outlet being substantially axially perpendicular, the relief inlet and the relief outlet being substantially axially perpendicular;
wherein the pressure relief system comprises:
a body abutting walls of the housing;
a relief member disposed within the body, the relief member comprising an interior end and an exterior end; and
a lever rotatably coupled to the exterior end of the relief member by a connector; and
wherein the main valve and the relief valve are housed in the housing of the integral valve arrangement.

2. The integral valve arrangement according to claim 1, wherein the housing further comprises a hook disposed on an exterior end of the pressure relief system and comprising an opening configured to receive the lever, the exterior end opposite an interior end forming the side wall of the inlet, the hook being configured to prevent the lever and the relief member from moving laterally away from the inlet along an axis of the relief member.

3. The integral valve arrangement according to claim 2, wherein the relief member is configured to axially rotate to enable the lever to be placed in a first position behind the hook and a second position free of the hook, the first position being configured to prevent pressure relief of the inlet, and the second position being configured to enable pressure relief of the inlet.

4. The integral valve arrangement according to claim 3, wherein the lever is configured to rotate about the connector from a position substantially perpendicular to the relief member to a position non-perpendicular to the relief member, the non-perpendicular position being configured to enable an open passage from the relief inlet to the relief outlet.

5. The integral valve arrangement according to claim 1, wherein the pressure relief system further comprises a spring and a tensioner, the spring disposed around the relief member and interposed between the interior end of the relief member and the tensioner, the relief member being biased to a closed position in response to the spring, the closed position preventing an open passage from the relief inlet to the relief outlet.

6. The integral valve arrangement according to claim 5, wherein an outer surface of the tensioner comprises threads to enable precise adjustment of the tensioner and the spring.

7. The integral valve arrangement according to claim 5, wherein the spring is configured to compress in response to a pressure threshold being reached from the inlet to enable an open passage from the relief inlet to the relief outlet.

8. The integral valve arrangement according to claim 7, wherein the pressure threshold is approximately 175 pounds.

9. The integral valve arrangement according to claim 1, wherein the relief inlet is configured to be substantially non-parallel to the inlet, and wherein the relief outlet is configured to be substantially non-parallel to the outlet.

10. The integral valve arrangement according to claim 1, wherein the pressure relief system further comprises a plate defining an exterior wall of the body opposite the relief inlet.

11. The integral valve arrangement according to claim 10, wherein the pressure relief system further comprises a retaining ring external to the plate.

12. The integral valve arrangement according to claim 1, wherein the housing further comprises at least one sight glass disposed in a side wall of the first outlet to enable visibility within the first outlet.

13. The integral valve arrangement according to claim 1, wherein the main valve is a ball valve.

14. The integral valve arrangement according to claim 1, wherein the housing further comprises a second outlet substantially parallel and in a same axis as the first outlet, the second outlet disposed opposite the inlet from the first outlet.

15. The integral valve arrangement according to claim 1, wherein the pressure relief system further comprises at least one ring seal.

16. The integral valve arrangement according to claim 15, wherein the at least one ring seal comprises:
a first ring seal interposed between the walls of the housing and a first notch around a first perimeter of the body, the first perimeter being on an interior portion of the body adjacent to the relief inlet;
a second ring seal interposed between the walls of the housing and a second notch around a second perimeter of the body, the second perimeter being on a middle portion of the body and opposite the relief outlet from the first perimeter;
a third ring seal interposed between the body and a third notch around a third perimeter of a tensioner; and
a fourth ring seal interposed between the relief member and a fourth notch around a fourth interior perimeter of the tensioner.

17. A fire suppression sprinkler system, comprising:
a main conduit;
at least one branch conduit in fluid communication with the main conduit;
at least one sprinkler head coupled to the at least one branch conduit; and
an integral valve arrangement for testing and draining the fire suppression sprinkler system in fluid communication with the main conduit, the integral valve arrangement comprising:
a housing comprising a main valve and a relief valve, the main valve comprising an inlet and a first outlet, and the relief valve comprising a relief inlet in a side wall of the inlet, a relief outlet in a side wall of the first outlet, and a pressure relief system, the inlet and the first outlet being substantially axially perpendicular, the relief inlet and the relief outlet being substantially axially perpendicular;
wherein the pressure relief system comprises:
a body abutting walls of the housing;
a relief member disposed within the body, the relief member comprising an interior end and an exterior end; and
a lever rotatably coupled to the exterior end of the relief member by a connecting mechanism; and
wherein the main valve and the relief valve are housed in the housing of the integral valve arrangement.

18. The fire suppression sprinkler system according to claim 17, wherein the housing further comprises a hook disposed on an exterior end of the pressure relief system and comprising an opening configured to receive the lever, the exterior end opposite an interior end forming the side wall of the inlet, the hook being configured to prevent the lever and the relief member from moving laterally away from the inlet along an axis of the relief member.

19. The fire suppression sprinkler system according to claim 18, wherein the relief member is configured to axially rotate to enable the lever to be placed in a first position behind the hook and a second position free of the hook, the first position being configured to prevent pressure relief of the inlet, and the second position being configured to enable pressure relief of the inlet.

20. The fire suppression sprinkler system according to claim 19, wherein the lever is configured to rotate about the connecting mechanism from a position substantially perpendicular to the relief member to a position non-perpendicular to the relief member, the non-perpendicular position being configured to enable an open passage from the relief inlet to the relief outlet.

* * * * *